US011820016B2

(12) United States Patent
Ahire et al.

(10) Patent No.: US 11,820,016 B2
(45) Date of Patent: Nov. 21, 2023

(54) SYSTEM AND METHOD FOR AUTONOMOUSLY SCANNING AND PROCESSING A COMPLIANT WORKPIECE

(71) Applicant: GrayMatter Robotics Inc., Los Angeles, CA (US)

(72) Inventors: Avadhoot Ahire, Los Angeles, CA (US); Cheng Gong, Los Angeles, CA (US); Rishav Guha, Los Angeles, CA (US); Satyandra K. Gupta, Los Angeles, CA (US); Ariyan M. Kabir, Los Angeles, CA (US); Vihan Krishnan, Los Angeles, CA (US); Sagar Panchal, Los Angeles, CA (US); Brual C. Shah, Los Angeles, CA (US)

(73) Assignee: GrayMatter Robotics Inc., Los Angeles, CA (US)

( * ) Notice: Subject to any disclaimer, the term of this patent is extended or adjusted under 35 U.S.C. 154(b) by 0 days.

(21) Appl. No.: 18/126,941

(22) Filed: Mar. 27, 2023

(65) Prior Publication Data
US 2023/0302640 A1  Sep. 28, 2023

Related U.S. Application Data

(63) Continuation-in-part of application No. 18/111,470, filed on Feb. 17, 2023, which is a continuation of
(Continued)

(51) Int. Cl.
*B25J 9/16* (2006.01)
*G06T 1/00* (2006.01)
(Continued)

(52) U.S. Cl.
CPC ............ *B25J 9/1653* (2013.01); *B24B 51/00* (2013.01); *B25J 9/163* (2013.01); *B25J 9/1664* (2013.01);
(Continued)

(58) Field of Classification Search
CPC ........ B25J 9/1653; B25J 9/163; B25J 9/1664; B25J 9/1679; B25J 9/1697; B25J 11/0065;
(Continued)

(56) References Cited

U.S. PATENT DOCUMENTS

2013/0309944 A1* 11/2013 Verbinnen ................ B24B 5/16
451/47
2023/0034765 A1*  2/2023 Hane ...................... B25J 9/1656
(Continued)

*Primary Examiner* — Robert T Nguyen
(74) *Attorney, Agent, or Firm* — Run8 Patent Group, LLC; Peter Miller

(57) ABSTRACT

One variation of a method includes: accessing a maximum deflection distance of a workpiece; defining a first workpiece region characterized by a first compliance range; defining a second workpiece region characterized by a second compliance range greater than the first compliance range; assigning a nominal target force to the workpiece; navigating a sanding head across the first workpiece region during a processing cycle; driving the sanding head below a virtual unloaded surface of the workpiece stored in the virtual model to maintain forces, of the sanding head on the first workpiece region, approximating the nominal target force; calculating a maximum offset between the positions of the sanding head in the first workpiece region and the virtual unloaded surface; and, in response to the first maximum offset approaching the maximum deflection distance, assigning a lower target force to the second workpiece region of the workpiece.

20 Claims, 3 Drawing Sheets

Related U.S. Application Data application No. 17/829,193, filed on May 31, 2022, now Pat. No. 11,613,014, which is a continuation of application No. 17/826,840, filed on May 27, 2022, which is a continuation-in-part of application No. 17/390,885, filed on Jul. 31, 2021.

(60) Provisional application No. 63/059,932, filed on Jul. 31, 2020.

(51) Int. Cl.

| | | |
|---|---|---|
| *B25J 11/00* | (2006.01) | |
| *B25J 13/08* | (2006.01) | |
| *G06T 7/13* | (2017.01) | |
| *B24B 51/00* | (2006.01) | |
| *G06T 7/60* | (2017.01) | |
| *G06T 19/00* | (2011.01) | |

(52) U.S. Cl.
CPC .......... *B25J 9/1679* (2013.01); *B25J 9/1697* (2013.01); *B25J 11/0065* (2013.01); *B25J 13/085* (2013.01); *G06T 1/0014* (2013.01); *G06T 7/13* (2017.01); *G06T 7/60* (2013.01); *G06T 19/00* (2013.01); *G06T 2207/10024* (2013.01); *G06T 2219/004* (2013.01)

(58) Field of Classification Search
CPC ...... B25J 13/085; B24B 51/00; G06T 1/0014; G06T 7/13; G06T 7/60; G06T 19/00; G06T 2207/10024; G06T 2219/004
See application file for complete search history.

(56) References Cited

U.S. PATENT DOCUMENTS

| | | | |
|---|---|---|---|
| 2023/0210711 A1* | 7/2023 | Wang | A61H 1/00 601/9 |
| 2023/0251151 A1* | 8/2023 | Thurman | G01L 5/1627 73/862.338 |

\* cited by examiner

SYSTEM AND METHOD FOR AUTONOMOUSLY SCANNING AND PROCESSING A COMPLIANT WORKPIECE

CROSS-REFERENCE TO RELATED APPLICATIONS

This application is a continuation-in-part of U.S. application Ser. No. 18/111,470, filed on 17 Feb. 2023, which is a continuation of U.S. application Ser. No. 17/829,193, filed on 31 May 2022, which is a continuation of U.S. application Ser. No. 17/826,840, filed on 27 May 2022, which is a continuation-in-part of U.S. application Ser. No. 17/390,885, filed on 31 Jul. 2021, which claims the benefit of U.S. Provisional Application No. 63/059,932, filed on 31 Jul. 2020, each of which is incorporated in its entirety by this reference.

TECHNICAL FIELD

This invention relates generally to the field of automated finishing and more specifically to a new and useful method for system and method for autonomously scanning and processing a compliant workpiece in the field of automated finishing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method: Real-Time Target Force Adjustment

Figure 1:
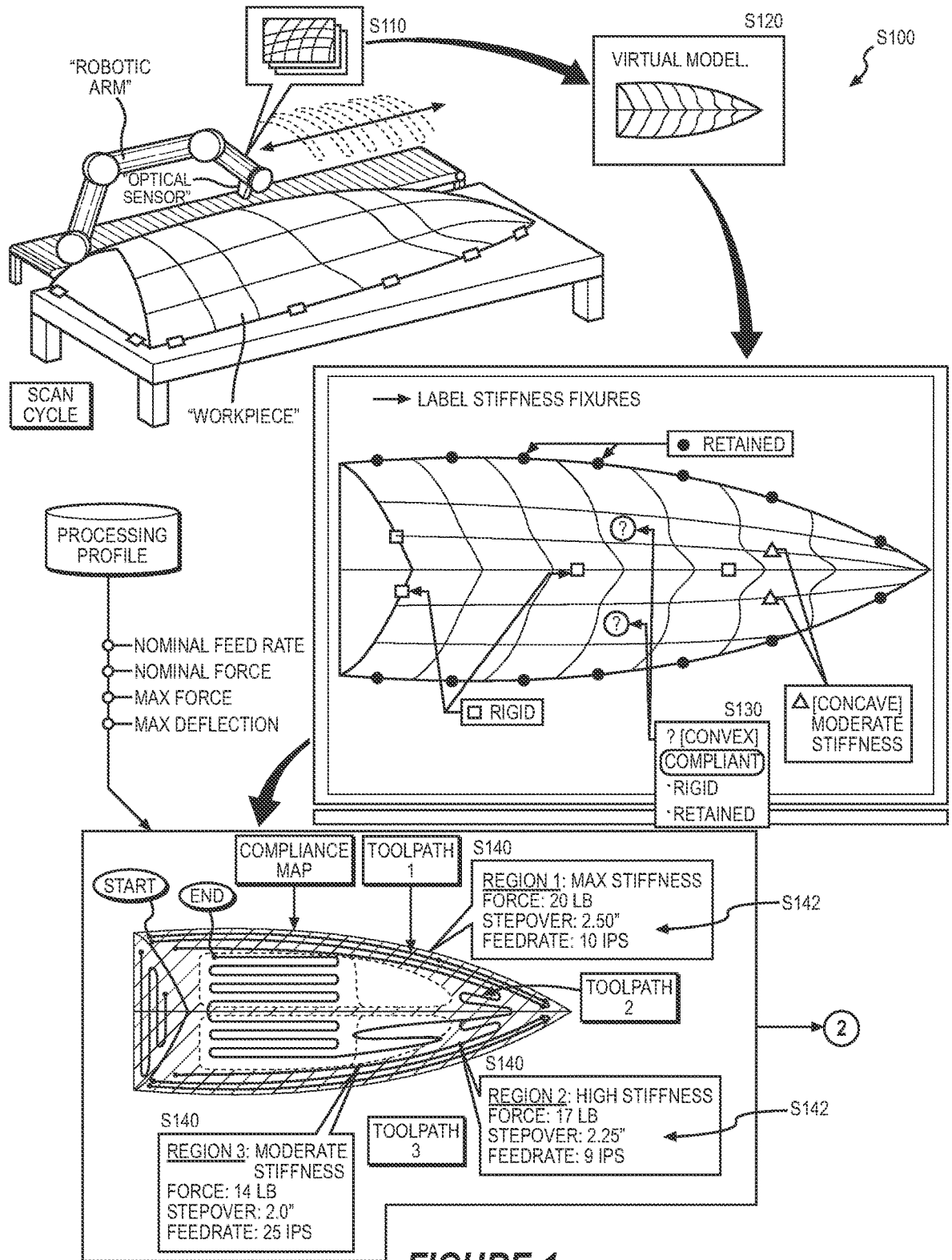
FIG. 1 is a flowchart representation of a method.
Figure 2:
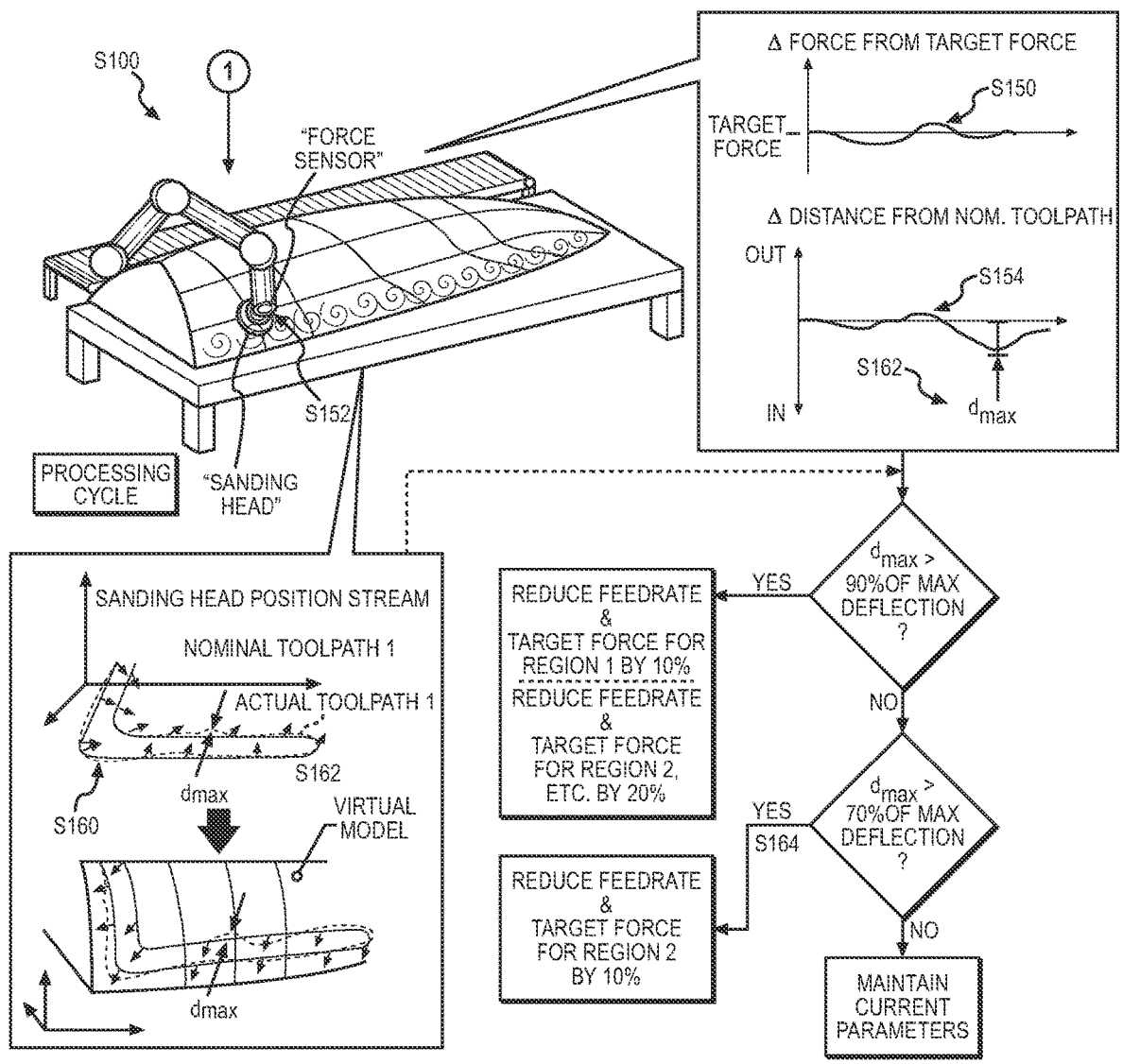
FIG. 2 is a flowchart representation of one variation of the method.

As shown in FIGS. 1 and 2, a method S100 for autonomously processing a workpiece includes: accessing a set of images captured by an optical sensor arranged on an end effector while traversing a scan path over a workpiece in Block S110; compiling the set of images into a virtual model defining unloaded surfaces of the workpiece in Block S120; prompting an operator to annotate the virtual model with compliance characteristics of the workpiece in Block S130; defining a first workpiece region characterized by compliance characteristics within a first compliance range based on the virtual model and compliance characteristics supplied by the operator in Block S140; assigning a first target force to the first workpiece region based on the first compliance range in Block S142; defining a second workpiece region, adjacent the first workpiece region, characterized by compliance characteristics within a second compliance range greater than the first compliance range based on the virtual model and compliance characteristics supplied by the operator in Block S140; and assigning a second target force, less than the first force, to the second workpiece region based on the second compliance range in Block S142.

The method S100 also includes, during a processing cycle: accessing a sequence of force values output by a force sensor coupled to a sanding head arranged on the end effector in Block S150; navigating the sanding head across the first workpiece region of the workpiece in Block S152 via a set of actuators coupled to the end effector; selectively driving the sanding head below a first unloaded surface of the workpiece stored in the virtual model to maintain forces, of the sanding head on the first workpiece region of the workpiece, to approximate the first target force, based on the sequence of force values in Block S154; navigating the sanding head across the second workpiece region of the workpiece in Block S152; and selectively driving the sanding head below a second unloaded surface of the workpiece stored in the virtual model to maintain forces, of the sanding head on the second workpiece region of the workpiece, to approximate the second target force, based on the sequence of force values in Block S154.

1.1 Method: Manual Operator Annotation

As shown in FIGS. 1 and 2, one variation of the method S100 includes: accessing a maximum deflection distance of the workpiece in Block S102; accessing a set of images captured by an optical sensor arranged on an end effector while traversing a scan path over the workpiece during a scan cycle in Block S110; compiling the set of images into a virtual model defining unloaded surfaces of the workpiece in Block S120; prompting an operator to annotate the virtual model with compliance characteristics of the workpiece in Block S130; defining a first workpiece region, on the workpiece, characterized by compliance characteristics within a first compliance range based on the virtual model and a set of compliance characteristics supplied by the operator in Block S140; defining a second workpiece region, on the workpiece, characterized by compliance characteristics within a second compliance range greater than the first compliance range based on the virtual model and the set of compliance characteristics supplied by the operator in Block S140; and assigning a nominal target force to the workpiece in Block S142.

This variation of the method S100 also includes, during a processing cycle: accessing a sequence of force values output by a force sensor coupled to a sanding head arranged on the end effector in Block S150; navigating the sanding head across the first workpiece region in Block S152 via a set of actuators coupled to the end effector; selectively driving the sanding head below a first unloaded surface of the workpiece stored in the virtual model to maintain forces, of the sanding head on the first workpiece region of the workpiece, to approximate (e.g., fall within a threshold difference of 5% of) the nominal target force, based on the sequence of force values in Block S154; tracking a first sequence of positions of the sanding head traversing the first workpiece region in Block S160; calculating a first maximum offset between the first sequence of positions and the first unloaded surface of the workpiece stored in the virtual model in Block S162; and, in response to the first maximum offset approaching the maximum deflection distance, assigning a second target force, less than the nominal force, to the second workpiece region of the workpiece in Block S164.

1.2 Method: Autonomous Deflection Test

Figure 3:
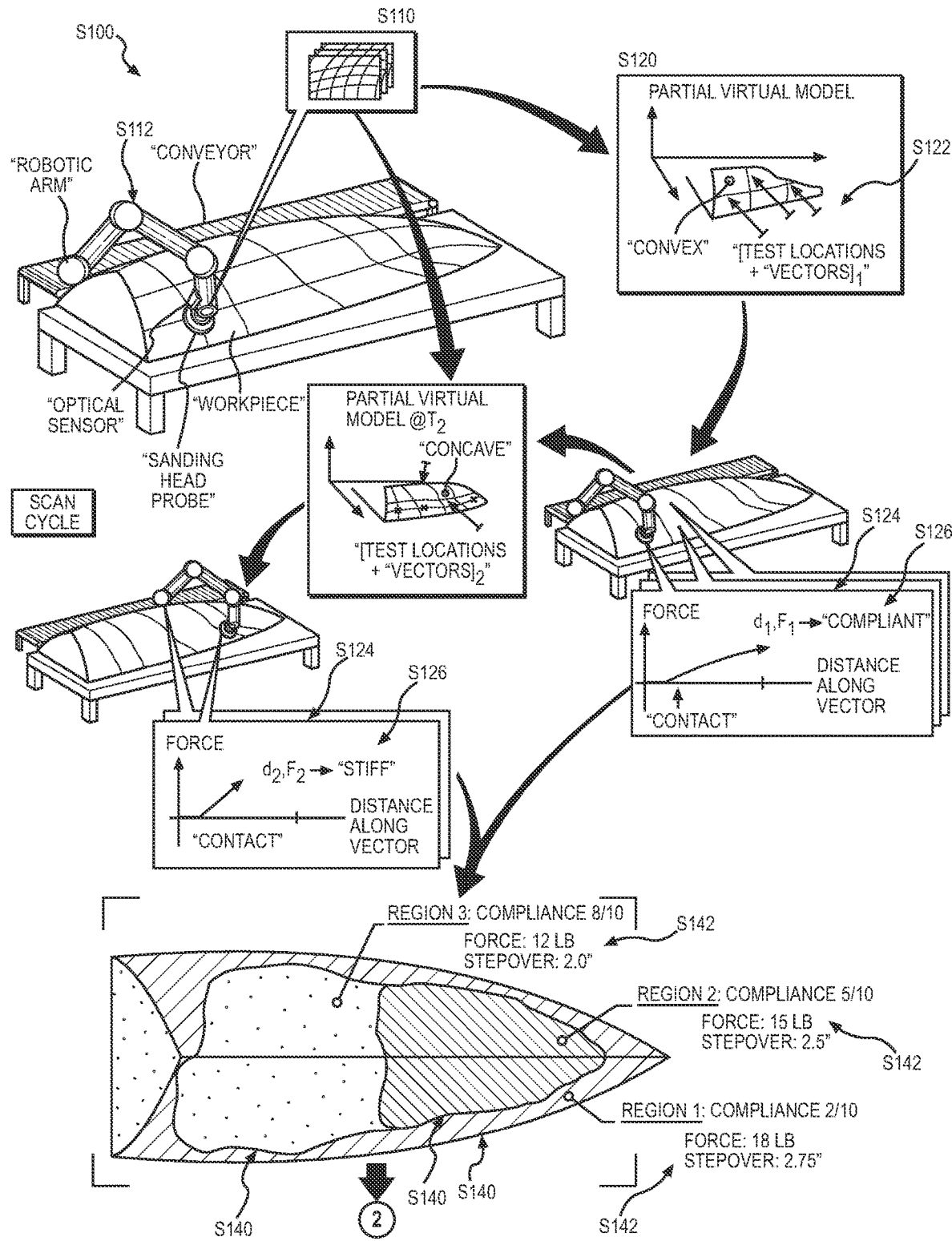
FIG. 3 is a flowchart representation of one variation of the method.

As shown in FIGS. 2 and 3, another variation of the method S100 includes, during a scan cycle: navigating an end effector over a first section of a workpiece in Block S112; accessing a first set of images captured by an optical sensor arranged on the end effector while traversing the first section of the workpiece in Block S110; compiling the first set of images into a virtual model defining unloaded surfaces of the workpiece in Block S120; calculating a first vector normal to a first location in the first section of the workpiece based on the virtual model in Block S122; accessing a first sequence of force values from a force sensor arranged on the end effector while driving the end effector along the first vector toward the first location on the workpiece in Block S124; characterizing a first compliance of the workpiece at the first location based on the first sequence of force values and a first sequence of positions of the end effector following contact between the end effector and the workpiece in Block S126; navigating the end effector over a second section of the workpiece in Block S112; accessing a second set of images captured by the optical sensor while traversing the second section of the workpiece in Block S110; expanding the virtual model based on the second set of images in Block S120; calculating a second vector normal to a second location in the second section of the workpiece in Block S122; accessing a second sequence of force values from the force sensor while driving the end effector along the second vector toward the second location on the workpiece in Block S124; characterizing a second compliance of the workpiece at the second location based on the second sequence of force values and a second sequence of positions of the end effector following contact between the end effector and the workpiece in Block S126; defining a first workpiece region characterized by compliance characteristics within a first compliance range based on the virtual model and the first compliance in Block S140; assigning a first target force to the first workpiece region based on the first compliance in Block S142; defining a second workpiece region characterized by compliance characteristics within a second compliance range greater than the first compliance range based on the virtual model and the second compliance in Block S140; and assigning a second target force, less than the first force, to the second workpiece region based on the second compliance range in Block S142.

This variation of the method S100 also includes, during a processing cycle: accessing a third sequence of force values output by the force sensor in Block S150; navigating the sanding head across the first workpiece region of the workpiece in Block S152 via the set of actuators; selectively driving the sanding head below a first unloaded surface of the workpiece stored in the virtual model to maintain forces, of the sanding head on the first workpiece region of the workpiece, to approximate the first target force, based on the third sequence of force values in Block S154; navigating the sanding head across the second workpiece region of the workpiece in Block S152; and selectively driving the sanding head below a second unloaded surface of the workpiece stored in the virtual model to maintain forces, of the sanding head on the second workpiece region of the workpiece, to approximate the second target force, based on the third sequence of force values in Block S154.

2. Applications

Generally, an autonomous scanning and sanding system (hereinafter the "system") can execute Blocks of the method S100: to autonomously scan a workpiece (or "part") loaded into a work cell; to compile scan data into a three-dimensional virtual model of the workpiece; to collect compliance (or "stiffness") data of regions of the workpiece; to define contiguous regions of the workpiece predicted to exhibit similar compliance characteristics; and to assign nominal target forces—for application of a sanding head against the workpiece—to contiguous regions of the workpiece based on compliance (or stiffness) characteristics of these regions.

The system can further execute Blocks of the method S100 to autonomously process (or "sand") the workpiece by: traversing a sanding head (e.g., including an orbital sander, compliant backing, and sanding disk) across a first contiguous region of the workpiece associated with a greatest predicted stiffness (i.e., a lowest predicted compliance); tracking movement of the sanding head below an unloaded surface of the workpiece represented in a corresponding region of the virtual model; interpreting inward deflection of the first region of the workpiece based on this movement of the sanding head; and adjusting a second target force assigned to a next region of the workpiece based on a magnitude of deflection of the first region of the workpiece, such as by decreasing the second target force assigned to the next region of the workpiece if deflection of the first region approaches a maximum deflection permitted for the workpiece, and vice versa.

For example, the system can interface with an operator to collect manually-entered compliance tags for various workpiece locations represented in the virtual model. Additionally or alternatively, the system can intermittently depress the sanding head or other probe against discrete locations across the workpiece and derive compliance tags for these workpiece locations based on force and deflection characteristics of these regions. The system can then: interpolate between the compliance tags to estimate a compliance map or compliance gradient across the workpiece; isolate contiguous regions of the workpiece exhibiting compliance values within discrete compliance ranges; and assign nominal force values to these individual regions based on their corresponding compliance ranges (e.g., proportional to their stiffnesses). The system can then: autonomously navigate the sanding head across and in contact with these regions of the workpiece in order of least compliant (i.e., most stiff) region assigned a highest nominal force to a most compliant (i.e., least stiff) region assigned a lowest nominal force; track deflection of the workpiece in each region based on differences between a three-dimensional surface traversed by the sanding head and a three-dimensional virtual surface represented by the virtual model; and automatically adjust a nominal force assigned to a next, more compliant region of the workpiece based on a maximum deflection of the workpiece in the current, stiffer region of the workpiece.

2.1 Unpredictable Workpiece Compliance

Generally, autonomous application of the sanding head onto a workpiece while maintaining a high target force between the sanding head and the workpiece yield a high rate of material removal but may also damage regions of the workpiece exhibiting high compliance, such as regions characterized by thin walls or lacking interior support structures. Conversely, autonomous application of the sanding head onto the workpiece while maintaining a low target force between the sanding head and the workpiece may avoid damage to high-compliance regions of the workpiece but yield slow material removal rates and therefore extend a processing duration for the workpiece.

Furthermore, the workpiece may be arranged over and retained on a table, fixture, or other support rig with a target surface of the workpiece facing upwardly and/or outwardly. The support rig may partially or fully obscure the rear structure of the workpiece—behind the target surfaces—from the optical sensors on the system. The interior structure of the workpiece may include thin-walled (or "shell") panel areas, unidirectional ribbing, multidirectional ribbing, gussets, non-uniform wall thicknesses, etc. that may yield varying compliance characteristics across these target surfaces of the workpiece. More specifically, different interior structures behind target surfaces on the workpiece may yield different elasticities, effective spring rates, yield strengths, and ultimate strengths within and between these target surfaces on the workpiece. Some or all of these interior structures may not be visible to optical sensors in the system when scanning or processing the workpiece.

For example, ribs, gussets, and other interior support structures may be integrated into the workpiece behind a target surface of the workpiece that otherwise exhibits high compliance. These interior support structures may thereby yield heterogenous, discontinuous compliance across this target surface on the workpiece.

Therefore, elasticities, effective spring rates, yield strengths, and/or ultimate strengths, etc. of target surfaces on the workpiece may not be predictable from scan data alone. Autonomously traversing the sanding head across these target surfaces of the workpiece with a high constant (and high) target force may damage regions of the workpiece that exhibit high compliance and insufficient stiffness to resist plastic deformation against this high target force. Conversely, traversing the sanding head across these target surfaces of the workpiece with a low constant target force may avoid damage to regions of the workpiece exhibiting high compliance and low stiffness but also yield a reduced material removal rate and therefore increased processing time for the workpiece. Furthermore, traversing the sanding head across these target surfaces of the workpiece with a constant target force may induce vibrations in the workpiece as the sanding head moves between regions of the workpiece exhibiting different compliance characteristics, thereby yielding inconsistent contact between the sanding head and the workpiece, inconsistent material removal from the workpiece, and low-quality surface finish across the workpiece.

Therefore, the system can execute Blocks of the method S100 to adaptively adjust target force applied by the sanding head across a workpiece during a processing cycle based on limited data collected during a preceding scan cycle and based on position and force data collected in real-time during the processing cycle.

More specifically, the system can execute Blocks of the method S100: to collect stiffness characteristics of the workpiece prior to processing (i.e., sanding) the workpiece with the sanding head, such as by empirically testing compliance in discrete target locations on the workpiece during a scan cycle and/or by collecting compliance annotations from an operator; to estimate contiguous regions of the workpiece exhibiting similar compliance characteristics; to sequentially process (i.e., autonomously apply the sanding head to) regions of workpiece in order of lowest to highest compliance (i.e., highest to lowest stiffness); to monitor deflection of the workpiece within each region as the system applies the sanding head to the workpiece with a target nominal force assigned to each region; to reduce the target nominal force assigned to a next region on the workpiece if deflection of the current region of the workpiece approaches a threshold maximum deflection designated for the workpiece; and/or to similarly reduce the target nominal force assigned to the current region if deflection of the current region of the workpiece approaches the threshold maximum deflection.

3. System

In one implementation described in U.S. patent application Ser. No. 18/111,470 and shown in FIG. 1, the system includes: a robotic arm arranged in or adjacent a work zone and that includes a set of articulatable joints interposed between a series of arm segments; an end effector supported on a distal end of the robotic arm; a sanding head arranged on or integrated into the end effector and configured to actuate (e.g., rotate) a sanding disk; an optical sensor (e.g., a set of depth sensors and/or color cameras) arranged on or integrated into the end effector and configured to capture optical images (e.g., depth maps, photographic color images) of a workpiece; and a force sensor (e.g., a one-dimensional axial force sensor) configured to output a signal representing a force applied by the sanding head to a workpiece normal to the sanding head; a set of position sensors configured to output signals representing (or assemblable into) a three-dimensional position of the end effector; a display configured to render a user interface accessible by an operator; and/or a controller configured to execute Blocks of the method S100.

In this implementation, the system can also include a conveyor configured to traverse the robotic arm longitudinally along the work zone, such as to reach and process an elongate part defining a high length-to-width ratio (e.g., a high aspect ratio), such as a boat hull or aircraft wing.

In another implementation, the system includes a multi-axis (e.g., five-axis) gantry configured to locate and articulate the end effector, sanding head, and optical sensor(s) across the work zone.

However, the system can include or define any other element or structure.

4. Workpiece Loading and Processing Limits

Block S102 of the method S100 recites accessing a maximum deflection distance of the workpiece. Generally, in Block S102, the system can retrieve processing limits and/or other parameters for autonomously sanding the workpiece, such as once the workpiece is loaded into the work zone adjacent the system, as shown in FIG. 1.

In particular, in preparation for autonomously processing (e.g., sanding) a workpiece by the system, an operator locates the workpiece in the work zone adjacent the system. For example, the operator may: load the workpiece onto a support rig (e.g., a wheeled table) and install intermittent clamps on the workpiece to retain the workpiece on the support rig; place the support rig and workpiece into the work zone; and lock wheels of the support rig.

The system can then prompt the operator to supply processing limits for the workpiece, such as including: a maximum applied force (i.e., a maximum force applied by the sanding head to any region of the workpiece); a maximum applied pressure (e.g., a maximum force applied by the sanding head to any unit area of the workpiece); a maximum deformation of the workpiece (e.g., a maximum distance of a point on the workpiece in an unloaded position to a loaded position when the system applies the sanding head to the workpiece). For example, the operator can supply these processing limits based on known strengths and compliance characteristics of the workpiece.

Additionally or alternatively, the system can retrieve these processing limits from a predefined processing profile. For example, the system can select a predefined processing profile stored in a processing profile database based on: a material of the workpiece (e.g., fiberglass, steel, aluminum) and/or a nominal wall thickness of the workpiece selected by the operator; or a length, aspect ratio, and/or a geometry profile of the workpiece (e.g., concave with high aspect ratio, convex with high aspect ratio, concave with low aspect ratio, convex with low aspect ratio) entered by the operator or derived from a scan of the workpiece completed by the system. The system can then load processing limits extracted from this processing profile.

However, the system can retrieve or load processing limits for the workpiece based on any other data supplied by the operator or collected autonomously by the system during a scan cycle as described below.

5. Part Scan

Blocks S112, S110, and S120 of the method S100 recite: navigating an end effector over a first section of a workpiece; accessing a first set of images captured by an optical sensor arranged on the end effector while traversing the first section of the workpiece; and compiling the first set of images into a virtual model defining unloaded surfaces of the workpiece. Generally, in Blocks S112, S110, and S120, the system can implement methods and techniques described in U.S. patent application Ser. No. 18/111,470 to: autonomously navigate an optical sensor (e.g., a depth sensor and/or a color camera) over the workpiece; capture optical images (e.g., depth maps, photographic color images) of the workpiece; and assemble these optical images into a three-dimensional virtual model of the workpiece, as shown in FIGS. 1 and 3.

For example, after the operator loads the workpiece into the work zone and confirms processing limits for the workpiece, the system can initiate a scan cycle. During the scan cycle, the system can: navigate the optical sensor—located on the end effector—along the scan path over and offset above the workpiece; monitor a distance between the end effector and the workpiece based on depth data collected by the optical sensor; and implement closed-loop controls to maintain a target offset distance between the optical sensor and the workpiece (e.g., 20", 50 centimeters). In this example, for a workpiece defining an oblong (or "elongate") geometry including a long axis located approximately parallel to a longitudinal axis of the work zone, the system can actuate a conveyor supporting the robotic arm to traverse the robotic arm along the longitudinal axis of the work zone while rastering the end effector and the optical sensor laterally across the work zone to capture a sequence of optical images representing all surfaces of the workpiece accessible by a sanding head on the end effector.

Furthermore, in this example, the system can compile these optical images into a three-dimensional virtual model of the workpiece, such as by implementing structure-from-motion techniques or by fusing these optical images into the virtual model based on poses of the robotic arm when these optical images were captured.

However, the system can implement any other methods or techniques to navigate the end effector and optical sensor over the workpiece, to collect optical images of the workpiece, and to generate a three-dimensional virtual model of the workpiece based on these optical images.

6. Empirical Local Compliance Map Derivation

One variation of the method S100 shown in FIG. 3 includes, during a scan cycle: navigating an end effector over a first section of a workpiece in Block S112; accessing a first set of images captured by an optical sensor arranged on the end effector while traversing the first section of the workpiece in Block Silo; compiling the first set of images into a virtual model defining unloaded surfaces of the workpiece in Block S120; calculating a first vector normal to a first location in the first section of the workpiece based on the virtual model in Block S122; accessing a first sequence of force values from a force sensor arranged on the end effector while driving the end effector along the first vector toward the first location on the workpiece in Block S124; and characterizing a first compliance of the workpiece at the first location based on the first sequence of force values and a first sequence of positions of the end effector following contact between the end effector and the workpiece in Block S126. In this variation, the method further includes: navigating the end effector over a second section of the workpiece in Block S112; accessing a second set of images captured by the optical sensor while traversing the second section of the workpiece in Block Silo; expanding the virtual model based on the second set of images in Block S120; calculating a second vector normal to a second location in the second section of the workpiece in Block S122; accessing a second sequence of force values from the force sensor while driving the end effector along the second vector toward the second location on the workpiece in Block S124; and characterizing a second compliance of the workpiece at the second location based on the second sequence of force values and a second sequence of positions of the end effector following contact between the end effector and the workpiece in Block S126.

Generally, in this variation, the system can: autonomously navigate the end effector over a first region of the workpiece; capture a first sequence of optical images of the first region of the workpiece; compile these images into a first segment of the virtual model representing the workpiece; define a set of (i.e., one or more) test locations in the first region of the workpiece; define an approach vector at each test location based on a geometry of the virtual model at corresponding locations; autonomously navigate the sanding head along these approach vectors and into contact with the workpiece at these locations; track forces applied by the sanding head to the workpiece and displacement of the workpiece from an unloaded geometry at these locations; derive compliance characteristics (e.g., linear or non-linear compliance characteristics; stiffness characteristics; inverse of linear or non-linear spring rates) of the workpiece at these locations in the first region of the workpiece based on these force and displacement data; and repeat this process for each subsequent region of the workpiece traversed by the end effector during the scan cycle. The system can therefore collect sparse empirical compliance data of the workpiece in real-time while scanning the workpiece during the scan cycle.

In one implementation, the system can construct a partial virtual model of the workpiece and define a set of test locations (or "stiffness probe locations") on the workpiece based on local characteristics of the workpiece—defined in the virtual model—near the present location of the end effector in real-time during a scan cycle. Upon defining a test location, the system can: pause the scan cycle; calculate a vector normal to the virtual model at the test location; and navigate the end effector and thus the sanding head (or a discrete force-displacement probe arranged on the end effector) along the vector toward the test location. Once the force on the end effector outputs a signal indicating application of a force greater than a minimum threshold force, the system can: detect contact between the sanding head (or the force-displacement probe) on the workpiece; record a nominal (or unloaded) position of the workpiece at this test location based on a pose of the end effector at this initial time of contact; and record a series of force data and displacement data (i.e., a one-dimensional change in position of the end effector from the nominal position parallel to the vector) while driving the sanding head along the vector. The system then: withdraws the end effector from this test location on the workpiece once the end effector approaches the earlier of—but does not reach or exceed—a maximum displacement (e.g., 0.50") set for the workpiece from the nominal position or application of the maximum force (e.g., 5 lbs.) set for the workpiece; derives a spring rate of the workpiece at this location based on the maximum force and concurrent displacement of the workpiece; annotates a corresponding point on the virtual model with this spring rate; and then resumes the scan cycle to scan a next region of the workpiece. The system: repeats this process for each other region and test location calculated for the workpiece; and interpolates between these spring rate and location pairs to generate a compliance (or stiffness) gradient representing compliance across the entire accessible area of the workpiece.

For example, the system can execute this process to collect sparse empirical compliance data for a workpiece characterized by a large and/or high-aspect-ratio (i.e., a long, narrow) workpiece in order to avoid multiple traversals over the workpiece. Conversely, the system can: first scan the workpiece to collect optical images of the workpiece; compile these optical images into a three-dimensional virtual model of the workpiece; and then implement similar methods and techniques to define and execute test locations across the workpiece based on a geometry of the workpiece represented in this virtual model, such as for a small or short workpiece.

6.1 Test Location Selection

In one implementation, the system projects a grid defining test locations onto the workpiece, such as on fixed lateral and longitudinal pitch distances proportional to the width and length of the workpiece, respectively.

In another implementation shown in FIG. 3, the system defines a pitch distance between adjacent test locations inversely proportional to a radius of curvature of the workpiece between these test locations. For example, the system can: implement methods and techniques described above to construct a first segment of the virtual model based on optical images collected while traversing the end effector across a first region of the workpiece; derive a minimum or effective radius of this first region of the workpiece from the corresponding segment of the virtual model; and set a shorter pitch distance between test locations within the first region of the workpiece if this minimum or effective radius is large, and vice versa. More specifically, a large effective radius within the first region of the workpiece corresponds to a flatter surface that may exhibit less inherent stiffness and therefore may be more susceptible to damage from application of excess force than a tightly curved surface characterized by a small effective radius. Therefore, the system can set a shorter pitch distance between test locations—and therefore a higher frequency of test locations—within the first region of the workpiece if this region exhibits a large effective radius, and vice versa.

Therefore, in this implementation, the system can: characterize a first effective radius of the first region of the workpiece based on a first surface profile of the first region of the workpiece represented in a first section of the virtual model; assign a first test location density to the first region of the workpiece based on (e.g., proportional to) the first effective radius; define a first quantity of test locations in the first region of the workpiece according to the first test location density; and then drive the end effector against these test locations to collect sparse empirical compliance data for this first region of the workpiece. The system can then: characterize a second effective radius of the second region of the workpiece—less than the first radius—based on a second surface profile of the second region of the workpiece represented in a second section of the virtual model; assign a second test location density—less than the first density—to the second region of the workpiece based on (e.g., proportional to) the second effective radius; define a second quantity of test locations in the second region of the workpiece according to the second test location density; and then drive the end effector against these test locations to collect sparse empirical compliance data for this second region of the workpiece.

In a similar example, the system can set a short pitch distance between test locations (or a high frequency of test locations) near edges of the workpiece, such as specifically along unconstrained edges of the workpiece or edges of the workpiece not directly supported by the support rig below.

In a similar implementation, because concave surfaces on the workpiece may be less susceptible to inward deformation (or "oil-canning") than convex surfaces on the workpiece due to application of the sanding head on the workpiece, the system can: set a wider pitch distance between test locations (or a lower frequency of test locations) in concave regions of the workpiece; and set a short pitch distance between test locations (or a higher frequency of test locations) in convex regions of the workpiece. The system can thus derive characteristics (e.g., convex or concave geometry; minimum or effective radius) based on workpiece features stored in the virtual model.

Then, after defining a test location in the virtual model, the system can: calculate a test axis (e.g., a vector in system coordinates) normal to the test location in the virtual model; extract a three-dimensional position of this test location in system coordinates; navigate the end effector above this three-dimensional position of this test location in system coordinates; orient the end effector to align a test axis of the end effector (e.g., a test axis of the sanding head on the end effector) to the test axis in system coordinates; then articulate the robotic arm along (or otherwise parallel to) the test axis to move the end effector toward the three-dimensional position of this test location in the system. Concurrently, the system can access an initial sequence of force values from the force sensor in the end effector while driving the end effector along this test axis vector toward the first test location on the workpiece. Then, in response to a force value—in this initial sequence of force values—exceeding a low threshold contact force, the system can: detect initial contact between the sanding head; record a true unloaded three-dimensional position of the test location in system coordinates at the time of this initial contact; and then record a sequence of force values from the force sensor while continuing to drive the end effector along the test axis and below the test location. The system can also calculate a maximum offset position—inset from the true unloaded three-dimensional position of the test location along the test axis—by a distance less than the maximum deflection distance set for the workpiece. Then, in response to the end effector (e.g., the sanding head) approaching the first maximum offset position below the true unloaded three-dimensional position of the test location, the system can: withdraw the end effector (e.g., the sanding head) from the workpiece; calculate a spring force of the workpiece at the test location based on the maximum force in the sequence of force values and the corresponding position of the end effector below the true unloaded three-dimensional position of the test location during this compliance test cycle; and then move to a next test location defined on the workpiece or resume the scan cycle.

7. Operator-Entered Compliance Annotations

Another variation of the method S100 shown in FIG. 1 includes Block S130, which recites prompting an operator to annotate the virtual model with compliance characteristics of the workpiece. Generally, in Block S130, the system can interface with the operator to record stiffness (or compliance) annotations for points, edges, or areas (hereinafter "regions") of the workpiece.

In particular, in this variation, the system can: collect scan data representing the workpiece while traversing the end effector and optical sensor across the workpiece; compile these scan data into a three-dimensional virtual model of the workpiece; render the virtual model in a user interface (e.g., on a display adjacent the system) accessible to the operator; and prompt the operator to annotate the virtual model with compliance tags, such as by writing high-, moderate-, and low-compliance tags (or low-, moderate-, and high-stiffness tags, respectively) to representative point locations, edges, and/or areas on the virtual model based on compliance of corresponding regions of the workpiece.

In one implementation, the system prompts the operator to manually annotate the virtual model with compliance estimates (e.g., the operator's perception of workpiece compliance), such as including: "retained" (or "very stiff") regions, such as workpiece edges clamped to a table, fixture, or other support rig; "stiff" regions, such as thick-walled regions or regions as backed by large or rigid interior structures, gussets, or webs; and/or "compliant" regions, such as unsupported edges or large, flat, thin-walled regions of the workpiece. For example, the system can prompt the operator to "click on" points on the virtual model to place virtual pins and to select a retained, stiff, or compliant label for each of these virtual pins from a dropdown menu. Additionally or alternatively, for each virtual pin dropped on the virtual model by the operator, the computer system can: render a slider—defining a range of compliance options—linked to the virtual pin; and prompt the user to adjust the slider to an estimated compliance of the corresponding region of the workpiece.

In another implementation, the system: implements methods and techniques described above to define test locations in regions of the virtual model, such as based on surface geometries of the workpiece represented in these regions of the virtual model; prompts the operator to enter compliance annotations at these particular test locations; and records compliance values thus entered by the operator at these test locations. In a similar implementation, the system can: implement methods and techniques described above to define a minimum density of test locations and a maximum or target pitch distance between test locations based on geometry characteristics of the workpiece represented in the virtual model; and prompt the operator to supply compliance annotations according to these density or pitch targets. In one example, the system: isolates a first concave section of the virtual model; and isolates a second convex section of the virtual model. The system then prompts the operator to locate a first density of points—annotated with compliance magnitudes—on the first concave section of the virtual model; and similarly prompts the operator to locate a second density of points—greater than the first density and annotated with compliance magnitudes—on the second concave section of the virtual model.

However, the system can implement any other methods or techniques to passively receive compliance annotations from the operator and/or actively query the operator for compliance annotations and particular locations on the workpiece.

8. Compliance Map Derivation

As shown in FIGS. 1 and 3, the system then: aggregates compliance values autonomously derived by the system and/or stored in compliance tags entered manually by the operator; interpolates between these compliance values to calculate a compliance gradient across the workpiece; and stores this compliance gradient in a three-dimensional compliance map of the workpiece. For example, the system can: extract a set of three-dimensional points—distributed across the virtual model and annotated with compliance magnitudes—from compliance annotations supplied by the operator; and interpolate between compliance magnitudes and locations of this set of points to generate a compliance gradient across the virtual model of the workpiece.

However, the system can implement any other method or technique to compile compliance data for the workpiece into a compliance map or other representation of varying compliance (or "stiffness") characteristics of the workpiece.

9. Part Segmentation by Compliance

Block S140 of the method S100 recites: defining a first workpiece region characterized by compliance characteristics within a first compliance range based on the virtual model and compliance characteristics supplied by the operator; and defining a second workpiece region, adjacent the first workpiece region, characterized by compliance characteristics within a second compliance range greater than the first compliance range based on the virtual model and compliance characteristics supplied by the operator. Generally, in Block S140, the system: identifies contiguous regions of the workpiece characterized by similar compliance values; and segments the virtual model of the workpiece accordingly. As described below and shown in FIGS. 1 and 3, the system then assigns different processing parameters—or different processing limits, specifically—to corresponding regions of the workpiece.

In one implementation, the system accesses or defines a set of compliance ranges for the workpiece, such as: 85-100% of maximum stiffness; 75-85% of maximum stiffness; 65-75% of maximum stiffness; 60-65% of maximum stiffness; 55-60% of maximum stiffness; etc. The system then calculates boundaries around contiguous regions of the compliance map that: contain stiffness values within (or greater than) these stiffness ranges; and define widths greater than a minimum width (e.g., 80% of the diameter of the sanding head). The system then segments the virtual model according to these boundaries. For example, the system can scan: the compliance map for a maximum stiffness of the workpiece; and prompt the operator to enter the set of compliance ranges, retrieve this set of compliance ranges stored in the operator profile, and/or retrieve a predefined set of compliance ranges for the workpiece in particular or all workpieces processed by the system. The system can then define a first contiguous region in the compliance map that: extends along an edge of the workpiece retained on the support rig; defines a width greater than the minimum width; and contains compliance test locations, operator compliance annotations, and/or interpolated compliance values indicating stiffness within the first stiffness range (e.g., "low compliance," "high stiffness," or 85-100% of the maximum stiffness of the workpiece). The system can similarly define a second contiguous region in the compliance map: adjacent the first region of the workpiece; that defines a width greater than the minimum width; and that contains compliance test locations, operator compliance annotations, and/or interpolated values indicating compliance within the second compliance range greater than the first compliance range (e.g., "low-moderate compliance," "moderate-high stiffness," or 75-85% of the maximum stiffness of the workpiece). The system can repeat this process to define other contiguous regions in the compliance map.

In another implementation, the system renders the virtual model of the workpiece on a display; and prompts the operator to annotate points on the virtual model with local compliance characteristics of the workpiece. The system then receives a set of compliance characteristics from the operator, such as including: a rigid tag associated with (i.e., linked to) a first feature in the virtual model and corresponding to a first point, edge or area on the workpiece; and a compliant tag associated with a second feature in the virtual model and corresponding to a second point, edge or area on the workpiece. Accordingly, the system: defines a first workpiece region—on the workpiece—containing the first feature; assigns a first target (or nominal) force to the first workpiece region; defines a second workpiece region containing the second feature; and assigns a second target force—less than the first (or nominal) force—to the second workpiece region.

In a similar implementation, the system receives a set of compliance characteristics of the workpiece from the operator, including: a retained tag associated with a first edge in the virtual model; a rigid tag associated with a first point in the virtual model; and a compliant tag associated with a second point in the virtual model. Accordingly, the system: defines an outer workpiece region of the workpiece containing the first edge and extending toward the first point; defines a first workpiece region containing the first point and extending toward the second point; and defines a second workpiece region containing the second point.

In another implementation, the system receives a set of compliance characteristics from the operator, including: a first set of rigid tags associated with a first set of points located on the virtual model; and a second set of compliant tags associated with a second set of points located on the virtual model. Accordingly, the system: interpolates a set of virtual boundaries between clusters of points in the first set of points and clusters of points in the second set of points; defines a first workpiece region spanning a first contiguous section on the virtual model within a first boundary containing a first cluster of points in the first set of points; and defines a second workpiece region adjacent the first workpiece region and spanning a second contiguous section on the virtual model within a second boundary containing a second cluster of points in the second set of points.

In yet another implementation, the system: renders the virtual model on a display; and prompts the operator to: locate a set of boundaries on the virtual model corresponding to regions on the workpiece exhibiting consonant compliance characteristics; and associates the set of regions with compliance magnitudes. Accordingly, the system receives a set of compliance characteristics—linked to these boundaries—from the operator, such as including: a retained tag associated with a first feature in the virtual model; a compliant tag associated with a second feature in the virtual model; and a compliant tag associated with a third feature in the virtual model. The system then: defines a first workpiece region based on a first boundary located on the virtual model by the operator; annotating the first workpiece region with a first compliance range based on a first compliance magnitude associated with the first boundary by the operator; defines a second workpiece region based on a second boundary located on the virtual model by the operator; and annotates the second workpiece region with a second compliance range based on a second compliance magnitude associated with the second boundary by the operator.

However, the system can segment the virtual model in any other way based on autonomously-detected, manually-entered, or derived compliance characteristics of the workpiece represented in the compliance map and/or the virtual model.

10. Target Processing Parameters

Block S142 of the method S100 recites: assigning a first target force to the first workpiece region based on the first compliance range; and assigning a second target force, less than the first force, to the second workpiece region based on the second compliance range. Generally, in Block S142, the system assigns target forces to workpiece regions based on autonomously-detected, manually-indicated, or derived (e.g., interpolated) maximum compliance (or minimum stiffness) characteristics of these regions, as shown in FIGS. 1 and 3.

More specifically, the system can assign a target (or maximum) force within each region of the workpiece: proportional to a minimum stiffness of the workpiece within this region; or inversely proportional to the maximum compliance of the workpiece within this region. In particular, application of the sanding head to the workpiece with a greater force may yield a higher material removal rate, thereby enabling the system to achieve target material removal from the workpiece at a higher feed rate (i.e., faster sanding head traversal rate across the workpiece) and/or at a larger stepover distance between adjacent segments of a toolpath traversed by the sanding head. However, application of the sanding head to the workpiece with a greater force may damage (e.g., plastically deform) the workpiece.

Therefore, the system can: calculate a target force for a region of the workpiece based on (e.g., inversely proportional to) a maximum compliance within the region; and set a nominal feed rate and/or a nominal stepover distance for this region of the workpiece proportional to this target force. The system can repeat this process for each region of the workpiece. For example, the system can: retrieve a nominal force for processing a rigid workpiece; and calculate a target force for a particular region of the workpiece proportional to a combination (e.g., product) of this nominal force and a stiffness coefficient of the region, such as: a stiffness coefficient of 100% for a rigid and constrained region of the workpiece; and stiffness coefficients less than 100% for more compliant (i.e., less stiff) regions of the workpiece, as indicated in the compliance map.

The system can also: access or retrieve a compliance characteristic of a compliant backing arranged on the sanding head and supporting a sanding disk; and calculate a target force for a region of the workpiece proportional to this compliance characteristic. Thus, because a sanding head configured with a more compliant (i.e., less stiff) backing may distribute an applied force over a wider area of the workpiece in contact with the sanding disk, the system can assign a higher target force to each region of the workpiece.

10.1 Tool Path Generation

The system can further implement methods and techniques described in U.S. patent application Ser. No. 18/111, 470 to define a toolpath within each region of the workpiece.

In one implementation shown in FIG. 1, the system sets a first feed rate for the first region proportional to the target force assigned to the first region. The system also sets a first stepover distance between segments of a first toolpath for a first region of the workpiece: based on (e.g., proportional to) the target force assigned to this region of the workpiece; and/or proportional to a minimum radius within the first region of the workpiece. The system then: defines a serpentine or boustrophedonic toolpath within the first region of the workpiece according to the nominal stepover distance; and stores this first toolpath as a first set of keypoints, wherein each keypoint represents a vertex or other point on the toolpath, defines a three-dimensional position on the workpiece, includes a vector normal to the workpiece at this three-dimensional position, and is labeled with the target force and the feed rate set for the first region. More specifically, the system can project the first toolpath onto the first region of the workpiece represented in the virtual model, which represents the workpiece in unloaded form. The system can then extract a three-dimensional position and normal vector of each vertex or other point on the first toolpath from the virtual model. Accordingly, the system can store the first toolpath as a first ordered sequence of keypoints: located on a first unloaded surface of the workpiece stored in (i.e., represented by) the virtual model; and contained within the first workpiece region.

In one variation, the system can iteratively adjust this first toolpath based on local radii of the workpiece along segments of the first toolpath. Additionally or alternatively, the system can adjust target forces assigned to segments of the first toolpath: proportional to local radii of convex subregions of the workpiece adjacent these toolpath segments; and inversely proportional to radii of concave subregions of the workpiece adjacent these toolpath segments. Accordingly, the system can set a force greater than the nominal target force within a concave subregion of the workpiece and a target force less than the nominal target force within a convex subregion of the workpiece.

The system can repeat this process for each other region of the workpiece.

11. Processing Cycle

Block S150 of the method S100 recites accessing a sequence of force values output by a force sensor coupled to a sanding head arranged on the end effector. Blocks S152 and S154 of the method S100 recite, via a set of actuators coupled to the end effector: navigating the sanding head across the first workpiece region of the workpiece in Block S152; selectively driving the sanding head below a first unloaded surface of the workpiece stored in the virtual model to maintain forces, of the sanding head on the first workpiece region of the workpiece, to approximate the first target force, based on the sequence of force values in Block S154; navigating the sanding head across the second workpiece region of the workpiece in Block S152; and selectively driving the sanding head below a second unloaded surface of the workpiece stored in the virtual model to maintain forces, of the sanding head on the second workpiece region of the workpiece, to approximate the second target force, based on the sequence of force values in Block S154.

Generally, Blocks S150, S152, and S154 of the system can implement methods and techniques described in U.S. patent application Ser. No. 18/111,470 to autonomously navigate the sanding head along a toolpath (e.g., a sequence of keypoints) defined for each region of the workpiece according to a corresponding target (or maximum) force, feed rate, and/or other processing parameters or processing limits, as shown in FIG. 2. In particular, the system first processes a region of the workpiece exhibiting a greatest minimum stiffness and then processes regions exhibiting sequentially lesser minimum stiffnesses.

The system also implements closed-loop controls to maintain a target force between the sanding head and the workpiece within each workpiece region—based on force values read from the force sensor integrated into the sanding head—by driving the sanding head toward and away from the workpiece along vectors normal to the workpiece, such as represented in keypoints of these toolpaths or extracted from the virtual model during the processing cycle. For example, for a first keypoint in the first ordered sequence of keypoints, the system can drive the set of actuators to: locate the sanding head at a first three-dimensional position intersecting the first keypoint; align an axis of the sanding head to a first vector contained in the first keypoint; and drive the sanding head, coaxial with the first vector, toward the workpiece to match force values, in a sequence of force values read from the force sensor in the sanding head, to a first target force assigned to a first toolpath containing the first keypoint. The system can then drive the set of actuators to interpolate a three-dimensional path and sanding head orientation from the first keypoint to the second keypoint while implementing closed-loop controls to apply the sanding head to the workpiece with the first target force. The system can repeat this process for each other keypoint defined along the first toolpath and then along subsequent toolpaths defined for other regions of the workpiece.

The system can further: track three-dimensional positions of the sanding head based on positions of the robotic arm; and calculate offsets between the three-dimensional positions of the sanding head and corresponding unloaded positions of the workpiece represented in the virtual model. Then, if offsets between the three-dimensional positions of the sanding head and corresponding unloaded positions of the workpiece represented in the virtual model approach a maximum deflection set for the workpiece, the system can: reduce the target force assigned to a next region of the workpiece; and/or reduce the target force assigned to a remainder of the toolpath of the current region of the workpiece.

11.1 Closed-Loop Controls: Maximum Deflection Controls for Next Region

As described above and shown in FIG. 2, the controller: navigates the sanding head through a series of keypoints defined in a toolpath assigned to a region of the workpiece; monitors forces applied by the sanding head onto the workpiece coaxial with the sanding head (i.e., normal to the sanding head); implements closed-loop controls to estimate distances to advance or retract the sanding head into or away from the workpiece as the sanding head moves to a next keypoint in order to maintain a target force assigned to this region of the workpiece; and navigates the sanding head off of the toolpath—along an axis orthogonal to the toolpath and normal to corresponding points on an unloaded surface represented by the virtual model—according to these advance and retract distances.

In one variation, the system also tracks a difference between: an actual position of the sanding head that yields an applied force approximating a target force assigned to the region of the workpiece when the sanding head occupies a particular keypoint in the toolpath; and a corresponding virtual point on an unloaded surface represented by the virtual model. The system can store this difference as a deflection distance of the workpiece at this keypoint and can repeat this process for each keypoint (and/or between keypoints) defined along the toolpath.

In this variation, if this deflection distance approaches (e.g., falls within 10% of) or exceeds the maximum deformation set for the workpiece, the system can: reduce the target force assigned to the current region of the workpiece for a remainder of the current toolpath; and/or reduce a target force assigned to a next region of the workpiece. More specifically, if the real position of a point on the current region of the workpiece in contact with the sanding head is deformed below a corresponding virtual point represented in the virtual model by a distance approaching or exceeding the maximum deformation, the system can reduce (e.g., by 5%) the target force, reduce a feed rate, and/or reduce a stepover distance set for a remainder of the current region of the workpiece in order to avoid excess deformation of this region of the workpiece. Additionally or alternatively, because the system processes the workpiece in order of stiffest regions followed by more compliant regions, if the real position of a point on the current region of the workpiece in contact with the sanding head is deformed below a corresponding virtual point represented in the virtual model by a distance approaching or exceeding the maximum deformation, the system can reduce (e.g., by 5%) the target force, reduce a feed rate, and/or reduce a stepover distance set for a next region of the workpiece in order to avoid excess deformation of this next region of the workpiece.

In one implementation, the system accesses a sequence of force values output by the force sensor coupled to (or arranged in) the sanding head in Block S150. The system can then: navigate the sanding head across the first workpiece region in Block S152; selectively drive the sanding head below a first unloaded surface of the workpiece stored in the virtual model to maintain forces, of the sanding head on the first workpiece region of the workpiece—to approximate a first target force assigned to the first workpiece region—based on the sequence of force values in Block S154; track a first sequence of positions of the sanding head traversing the first workpiece region in Block S160; and calculate a first maximum offset between the first sequence of positions and the first unloaded surface of the workpiece stored in the virtual model in Block S162. For example, the system can: project the actual toolpath traversed by the sanding head onto the virtual model; calculate distances between the toolpath and nearest surfaces on the virtual model; and store a maximum difference in this sequence of distances as the first maximum offset. Additionally or alternatively, the system can store a maximum deviation of the sanding head—from the first toolpath into the workpiece—as the first maximum offset within the first region of the workpiece.

Then, in response to the first maximum offset approaching the maximum deflection distance, the system can assign or calculate a second target force—less than the first target force—to a second, more compliant workpiece region of the workpiece in Block S164. For example, the computer system can set a second target force—assigned to a next region of the workpiece—proportional to the first target force, inversely proportional to the first maximum offset detected in the first region, and inversely proportional to a difference between minimum stiffnesses of the first and second region of the workpiece indicated in the compliance map. Additionally or alternatively, the system can reduce the first target force—proportional to the first maximum offset—for a remainder of the first workpiece region.

Conversely, in response to the first maximum offset detected within the first region remaining sufficiently below the maximum deflection distance, the system can map the same target force to the second, less compliant workpiece region, thereby enabling the system to process this next region of the workpiece at a higher force-to-compliance ratio and at a similar feed rate with low risk of excess deformation of this next region of the workpiece. Alternatively, the computer system can set the second target force for this next region of the workpiece: proportional to the first target force implemented in the first region; and inversely proportional to a difference between the minimum stiffness of the first region and the minimum stiffness of the second region of the workpiece indicated in the compliance map.

Therefore, the system can process the first, stiffest region of the workpiece to verify or adjust a target force assigned to a next, more compliant region of the workpiece based on deflection of the workpiece within the first region. The system can repeat this process for each subsequent region of the workpiece.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:

accessing a maximum deflection distance of a workpiece;

accessing a set of images captured by an optical sensor arranged on an end effector while traversing a scan path over the workpiece during a scan cycle;

compiling the set of images into a virtual model defining unloaded surfaces of the workpiece;

prompting an operator to annotate the virtual model with compliance characteristics of the workpiece;

defining a first workpiece region, on the workpiece, characterized by compliance characteristics within a first compliance range based on the virtual model and a set of compliance characteristics supplied by the operator;

defining a second workpiece region, on the workpiece, characterized by compliance characteristics within a second compliance range greater than the first compliance range based on the virtual model and the set of compliance characteristics supplied by the operator;

assigning a nominal target force to the workpiece; and during a processing cycle:

accessing a sequence of force values output by a force sensor coupled to a sanding head arranged on the end effector;

via a set of actuators coupled to the end effector:

navigating the sanding head across the first workpiece region; and based on the sequence of force values, selectively driving the sanding head below a first unloaded surface of the workpiece stored in the virtual model to maintain forces, of the sanding head on the first workpiece region of the workpiece, proximal the nominal target force;

tracking a first sequence of positions of the sanding head traversing the first workpiece region;

calculating a first maximum offset between the first sequence of positions and the first unloaded surface of the workpiece stored in the virtual model; and in response to the first maximum offset approaching the maximum deflection distance, assigning a second target force, less than the nominal target force, to the second workpiece region of the workpiece.

2. The method of claim 1, further comprising:
defining a third workpiece region, on the workpiece, characterized by compliance characteristics within a third compliance range greater than the second compliance range based on the virtual model and compliance characteristics supplied by the operator;
during the processing cycle:
via the set of actuators:
navigating the sanding head across the second workpiece region; and
selectively driving the sanding head below a second unloaded surface of the workpiece stored in the virtual model to maintain forces, of the sanding head on the second workpiece region of the workpiece, to approximate the second target force, based on the sequence of force values;
tracking a second sequence of positions of the sanding head traversing the second workpiece region;
calculating a second maximum offset between the second sequence of positions and the second unloaded surface of the workpiece stored in the virtual model; and
in response to the second maximum offset falling below the maximum deflection distance, assigning the second target force to the third workpiece region of the workpiece.

3. The method of claim 1, wherein assigning the second target force to the second workpiece region of the workpiece comprises reducing the nominal target force, proportional to the first maximum offset, to calculate the second target force.

4. The method of claim 1:
further comprising assigning a nominal feed rate for traversal of the sanding head across the workpiece;
wherein navigating the sanding head across the first workpiece region comprises navigating the sanding head across the first workpiece region at the nominal feed rate; and
further comprising, during the processing cycle:
in response to an offset between a position of the sanding head, in the first sequence of positions, and a corresponding segment of the first unloaded surface of the workpiece stored in the virtual model exceeding the maximum deflection distance:
reducing the nominal target force; and
reducing the nominal feed rate.

5. The method of claim 1:
wherein prompting the operator to annotate the virtual model comprises:
rendering the virtual model on a display; and
prompting the operator to annotate points on the virtual model with local compliance characteristics of the workpiece;
further comprising receiving the set of compliance characteristics from the operator comprising:
a rigid tag associated with a first feature in the virtual model; and
a compliant tag associated with a second feature in the virtual model;
wherein defining the first workpiece region on the workpiece comprises defining the first workpiece region containing the first feature; and
wherein defining the second workpiece region on the workpiece comprises defining the second workpiece region containing the second feature.

6. The method of claim 1:
further comprising receiving the set of compliance characteristics from the operator comprising:
a retained tag associated with a first edge in the virtual model;
a rigid tag associated with a first point in the virtual model; and
a compliant tag associated with a second point in the virtual model;
further comprising defining an outer workpiece region of the workpiece containing the first edge and extending toward the first point;
wherein defining the first workpiece region on the workpiece comprises defining the first workpiece region containing the first point and extending toward the second point;
wherein defining the second workpiece region on the workpiece comprises defining the second workpiece region containing the second point; and
further comprising, during the processing cycle:
via the set of actuators:
navigating the sanding head across the outer workpiece region; and
based on the sequence of force values, selectively driving the sanding head below an outer unloaded surface of the workpiece stored in the virtual model to maintain forces, of the sanding head on the outer workpiece region of the workpiece, proximal the nominal target force;
tracking an initial sequence of positions of the sanding head traversing the outer workpiece region;
calculating an initial maximum offset between the initial sequence of positions and the outer unloaded surface of the workpiece stored in the virtual model; and
in response to the initial maximum offset falling below the maximum deflection distance, assigning the nominal target force to the first workpiece region of the workpiece.

7. The method of claim 1:
further comprising:
receiving the set of compliance characteristics from the operator comprising:
a first set of rigid tags associated with a first set of points located on the virtual model; and
a second set of compliant tags associated with a second set of points located on the virtual model;
interpolating a set of virtual boundaries between clusters of points in the first set of points and clusters of points in the second set of points;
wherein defining the first workpiece region on the workpiece comprises defining the first workpiece region spanning a first contiguous section on the virtual model within a first boundary, in the set of virtual boundaries, containing a first cluster of points in the first set of points; and
wherein defining the second workpiece region on the workpiece comprises defining the second workpiece region adjacent the first workpiece region and spanning a second contiguous section on the virtual model within a second boundary, in the set of virtual boundaries, containing a second cluster of points in the second set of points.

8. The method of claim 1:
further comprising receiving the set of compliance characteristics from the operator comprising:
a retained tag associated with a first feature in the virtual model;
a compliant tag associated with a second feature in the virtual model; and a compliant tag associated with a third feature in the virtual model;
wherein prompting the operator to annotate the virtual model comprises:
rendering the virtual model on a display; and
prompting the operator to:
locate a set of boundaries on the virtual model corresponding to regions on the workpiece exhibiting consonant compliance characteristics; and
associate the set of regions with compliance magnitudes;
wherein defining the first workpiece region on the workpiece comprises:
defining the first workpiece region based on a first boundary, in the set of boundaries, located on the virtual model by the operator; and
annotating the first workpiece region with the first compliance range based on a first compliance magnitude associated with the first boundary by the operator; and
wherein defining the second workpiece region on the workpiece comprises:
defining the second workpiece region based on a second boundary, in the set of boundaries, located on the virtual model by the operator; and
annotating the second workpiece region with the second compliance range based on a second compliance magnitude associated with the second boundary by the operator.

9. The method of claim 1:
further comprising:
receiving the set of compliance characteristics from the operator comprising a set of points distributed across the virtual model, each point in the set of points annotated with a compliance magnitude; and
interpolating between compliance magnitudes and locations of the set of points to generate a compliance gradient across the virtual model;
wherein defining the first workpiece region on the workpiece comprises defining the first workpiece region spanning a first contiguous region in the compliance gradient bounded by the first compliance range; and
wherein defining the second workpiece region on the workpiece comprises defining the second workpiece region spanning a second contiguous region in the compliance gradient bounded by the second compliance range.

10. The method of claim 9:
further comprising:
isolating a first concave section of the virtual model; and
isolating a second convex section of the virtual model; and
wherein prompting the operator to annotate the virtual model with compliance characteristics of the workpiece comprises:
prompting the operator to locate a first density of points, annotated with compliance magnitudes, on the first concave section of the virtual model; and
prompting the operator to locate a second density of points, annotated with compliance magnitudes, on the second concave section of the virtual model, the second density greater than the first density.

11. The method of claim 9:
further comprising:
isolating a first section of the virtual model characterized by a first effective radius; and
isolating a second section of the virtual model characterized by a second effective radius greater than the effective radius; and
wherein prompting the operator to annotate the virtual model with compliance characteristics of the workpiece comprises:
prompting the operator to locate a first density of points, annotated with compliance magnitudes, on the first section of the virtual model; and
prompting the operator to locate a second density of points, annotated with compliance magnitudes, on the second section of the virtual model, the second density greater than the first density.

12. The method of claim 1:
further comprising:
defining a first toolpath section comprising a first ordered sequence of keypoints located on the first unloaded surface of the workpiece stored in the virtual model and contained within the first workpiece region;
defining a second toolpath section comprising a second ordered sequence of keypoints located on the second unloaded surface of the workpiece stored in the virtual model and contained within the second workpiece region;
for each keypoint in the first ordered sequence of keypoints and the second ordered sequence of keypoints:
calculating a vector normal to the virtual model at a location of the keypoint on the virtual model; and
storing the vector in the keypoint; and
ordering the second toolpath section after the first toolpath section; and
wherein navigating the sanding head across the first workpiece region and selectively driving the sanding head below the first unloaded surface of the workpiece comprises:
for a first keypoint in the first ordered sequence of keypoints, via the set of actuators:
locating the sanding head at a first position intersecting the first keypoint;
aligning an axis of the sanding head to a first vector contained in the first keypoint; and
driving the sanding head, coaxial with the first vector, toward the workpiece to match force values, in the sequence of force values, to the nominal target force.

13. The method of claim 1:
further comprising:
accessing a maximum force for the workpiece; and
accessing a compliance characteristic of a compliant backing arranged on the sanding head and supporting a sanding disk; and
wherein assigning the nominal target force to the workpiece comprises calculating the nominal target force proportional to the backing compliance and less than the maximum force.

14. The method of claim 1:
further comprising, during the scan cycle preceding the processing cycle, navigating the optical sensor along the scan path over and offset above the workpiece:
the set of actuators comprising:
a robotic arm supporting the end effector and the sanding head, the sanding head comprising an orbital sander; and
a conveyor configured to traverse the robotic arm along a longitudinal axis; and the workpiece defining an elongate geometry comprising a long axis approximately parallel to the longitudinal axes of the conveyor; and wherein accessing the sequence of force values comprises accessing the sequence of force values output by the force sensor arranged between the end effector and the sanding head.

15. A method comprising:

accessing a set of images captured by an optical sensor arranged on an end effector while traversing a scan path over a workpiece;

compiling the set of images into a virtual model defining unloaded surfaces of the workpiece;

prompting an operator to annotate the virtual model with compliance characteristics of the workpiece;

defining a first workpiece region characterized by compliance characteristics within a first compliance range based on the virtual model and compliance characteristics supplied by the operator;

assigning a first target force to the first workpiece region based on the first compliance range;

defining a second workpiece region, adjacent the first workpiece region, characterized by compliance characteristics within a second compliance range greater than the first compliance range based on the virtual model and compliance characteristics supplied by the operator;

assigning a second target force, less than the first force, to the second workpiece region based on the second compliance range; and during a processing cycle:
accessing a sequence of force values output by a force sensor coupled to a sanding head arranged on the end effector; and
via a set of actuators coupled to the end effector:
navigating the sanding head across the first workpiece region of the workpiece;
selectively driving the sanding head below a first unloaded surface of the workpiece stored in the virtual model to maintain forces, of the sanding head on the first workpiece region of the workpiece, within to approximate the first target force, based on the sequence of force values;
navigating the sanding head across the second workpiece region of the workpiece; and
selectively driving the sanding head below a second unloaded surface of the workpiece stored in the virtual model to maintain forces, of the sanding head on the second workpiece region of the workpiece, to approximate the second target force, based on the sequence of force values.

16. The method of claim 1:

wherein prompting the operator to annotate the virtual model comprises:
rendering the virtual model on a display; and
prompting the operator to annotate points on the virtual model with local compliance characteristics of the workpiece;
further comprising receiving the set of compliance characteristics from the operator comprising:
a rigid tag associated with a first feature in the virtual model; and
a compliant tag associated with a second feature in the virtual model;
wherein defining the first workpiece region on the workpiece comprises defining the first workpiece region containing the first feature; and wherein defining the second workpiece region on the workpiece comprises defining the second workpiece region containing the second feature.

17. A method comprising:

during a scan cycle:
navigating an end effector over a first section of a workpiece;
accessing a first set of images captured by an optical sensor arranged on the end effector while traversing the first section of the workpiece;
compiling the first set of images into a virtual model defining unloaded surfaces of the workpiece;
calculating a first vector normal to a first location in the first section of the workpiece based on the virtual model;
accessing a first sequence of force values from a force sensor arranged on the end effector while driving the end effector along the first vector toward the first location on the workpiece;
characterizing a first compliance of the workpiece at the first location based on the first sequence of force values and a first sequence of positions of the end effector following contact between the end effector and the workpiece;
navigating the end effector over a second section of the workpiece;
accessing a second set of images captured by the optical sensor while traversing the second section of the workpiece;
expanding the virtual model based on the second set of images;
calculating a second vector normal to a second location in the second section of the workpiece;
accessing a second sequence of force values from the force sensor while driving the end effector along the second vector toward the second location on the workpiece;
characterizing a second compliance of the workpiece at the second location based on the second sequence of force values and a second sequence of positions of the end effector following contact between the end effector and the workpiece;
defining a first workpiece region characterized by compliance characteristics within a first compliance range based on the virtual model and the first compliance;
assigning a first target force to the first workpiece region based on the first compliance;
defining a second workpiece region characterized by compliance characteristics within a second compliance range greater than the first compliance range based on the virtual model and the second compliance; and
assigning a second target force, less than the first force, to the second workpiece region based on the second compliance range; and during a processing cycle:
accessing a third sequence of force values output by the force sensor; and
via the set of actuators:
navigating the sanding head across the first workpiece region of the workpiece;
selectively driving the sanding head below a first unloaded surface of the workpiece stored in the virtual model to maintain forces, of the sanding head on the first workpiece region of the workpiece, to approximate the first target force, based on the third sequence of force values;

navigating the sanding head across the second workpiece region of the workpiece; and selectively driving the sanding head below a second unloaded surface of the workpiece stored in the virtual model to maintain forces, of the sanding head on the second workpiece region of the workpiece, to approximate the second target force, based on the third sequence of force values.

18. The method of claim 17, further comprising:

characterizing a first effective radius of the first region of the workpiece based on a first section of the virtual model representing the first region of the workpiece;

assigning a first test location density to the first region of the workpiece based on the first effective radius;

defining a first quantity of locations, comprising the first location, in the first region of the workpiece according to the first test location density;

characterizing a second effective radius of the second region of the workpiece based on a second section of the virtual model representing the second region of the workpiece, the second effective radius greater than the first density;

assigning a second test location density to the second region of the workpiece based on the second effective radius, the second test location density greater than the first test location density; and defining a second quantity of locations, comprising the second location, in the second region of the workpiece according to the second test location density.

19. The method of claim 17:

further comprising accessing a maximum deflection distance of the workpiece;

wherein accessing the first sequence of force values comprises:

accessing an initial sequence of force values from the force sensor while driving the end effector along the first vector toward the first location on the workpiece; and in response to a force value, in the initial sequence of force values, exceeding a threshold force, recording the first sequence of force values while driving the end effector along the first vector toward the first location on the workpiece; and further comprising:

in response to the force value, in the initial sequence of force values, exceeding the threshold force, recording a first contact position of the sanding head on the workpiece at the first location;

calculating a first maximum offset position, inset from the first contact position along the first vector, by a distance less than the maximum deflection distance; and in response to the sanding head approaching the first maximum offset position, withdrawing the sanding head from the workpiece.

20. The method of claim 17, further comprising:

accessing a maximum deflection distance of the workpiece;

tracking a third sequence of positions of the sanding head traversing the first workpiece region;

calculating a first maximum offset between the third sequence of positions and the first unloaded surface of the workpiece stored in the virtual model; and in response to the first maximum offset approaching the maximum deflection distance, reducing the second target force assigned to the second workpiece region of the workpiece.

* * * * *